INVENTOR.
Robert L. Smith
BY
Sam J. Slotsky
ATTORNEY

United States Patent Office 2,914,006
Patented Nov. 24, 1959

2,914,006

SEEDER, FERTILIZER AND TILLER COMBINE

Robert L. Smith, Battle Creek, Iowa

Application August 30, 1956, Serial No. 607,056

1 Claim. (Cl. 111—67)

My invention relates to a portable structure having a certain plurality of fertilizing and seeding elements attached thereto and operated therefrom.

An object of my invention is to provide such an arrangement in which crop seed can be deposited and disked, fertilizer can be deposited and disked, and then grass seed can be deposited and harrowed if desired, my invention providing means wherein the above mentioned sequence is efficiently provided by merely drawing the portable arrangement forwardly, my invention further contemplating as an objective means wherein the seeding and fertilizing units can be disconnected when the entire framework is being transported.

A further object of my invention contemplates the provision of raising the disking portions of the device when desired.

My arrangement further contemplates a vehicle in which the various units above described can be interchanged if such is desired.

With these and other objects in view, my invention consists in the construction, arrangement, and combination of the various parts of my device, whereby the objects contemplated are attained, as hereinafter more fully set forth, pointed out in my claim, and illustrated in the accompanying drawings, in which:

Figure 1:
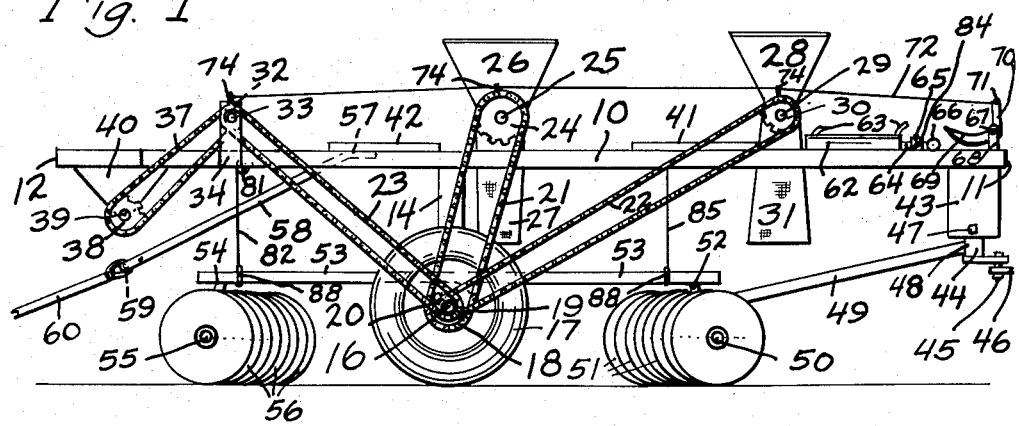
Figure 1 is a side elevation of the device.
Figure 2:
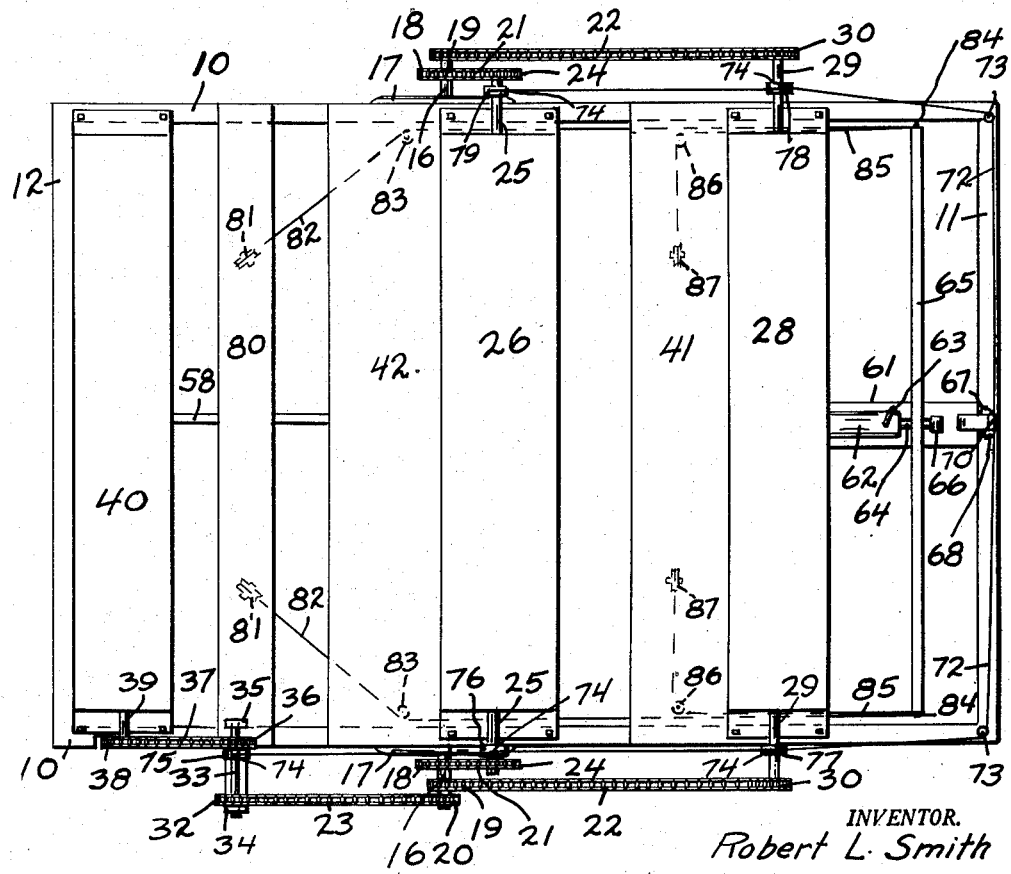
Figure 2 is a plan view of Figure 1, showing the upper portions.
Figure 3:
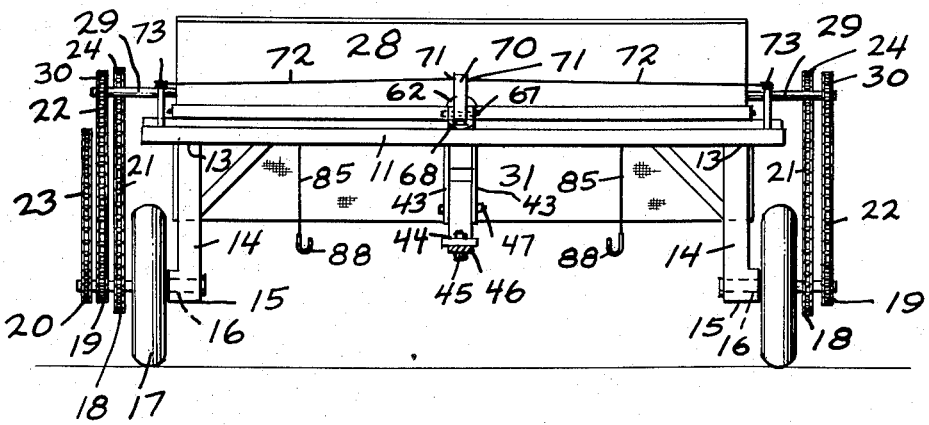
Figure 3 is an end view of Figure 1 with certain of the disking portions etc being removed.

I have used the character 10 to designate side members of a framework having the end members 11 and 12, and extending inwardly from the members 10 are suitable plates to which are attached at 13 the downwardly projecting posts 14 having the bearing portions 15 in which portions 15 are received a pair of stub shafts 16 which are journaled within the portions 15, and attached to the shafts 16 are the transport wheels 17.

Attached to one of the shafts 16 are the various sprocket members 18, 19 and 20 over which pass the chains 21, 22 and 23, the chains 21 engaging further sprockets 24 which drive the shaft 25, which shaft passes within the hopper 26, the hopper 26 containing suitable fertilizer, the shaft 25 being split centrally or being arranged in any other manner. The hopper 26 communicating with the upwardly collapsible boxing 27 which is open at the bottom to allow the fertilizer to pass therethrough.

A further hopper 28 includes crop seed, the agitating shaft 29 of which is secured to the sprockets 30 over which sprockets the sprocket chains 22 pass, and communicating with the hopper 28 is a further upwardly collapsible boxing 31 which is also open at the bottom to allow the seed to pass therethrough.

The sprocket chain 23 passes over a further sprocket 32 which is secured to a shaft 33 journaled within the supports 34 and 35 which are attached to the framework portion 10, and attached to the shaft 25 is a further sprocket 36 over which passes the sprocket chain 37 which engages a sprocket 38 which drives the shaft 39, which shaft 39 passes within the further hopper 40, the hopper 40 being adapted to contain grass seed, the shaft 39 driving the rotatable agitating member therein, the lower end of the hopper 40 including the usual small opening for allowing the seed to drop therefrom. A pair of transversely positioned walk boards 41 and 42 are positioned adjacently to the hoppers so that they can be conveniently reached. Attached to the forward end of the framework are the spaced plates 43 which are secured to the member 44 to which member 44 is pinned or otherwise hitched at 45 the drawbar 46 of a suitable tractor or other drawing vehicle, the member 44 being pivoted at 47 to the plates 43, and attached to the member 44 at 48 is the yoke 49 which is suitably attached to the transverse axle or shaft 50 of the disk unit having a plurality of disks 51, the disk unit being further attached to the members 52 which are attached to the longitudinally extending members 53 which extend rearwardly and are attached at 54 to the axles or shafts 55 of the further disk members 56. Attached at 57 beneath the member 42 is a rearwardly extending member 58 including the hook at 59 whereby the hook is adapted to be secured to the yoke portions 60 of a suitable harrow.

Attached to a forwardly positioned plate 61 which is suitably secured to the framework, is a hydraulic cylinder 62 having the tubes 63 communicating therewith which tubes pass to the hydraulic oil supply of the tractor, and contained within the cylinder 62 is a piston rod 64 secured to a suitable piston, and attached to the rod 64 is a laterally positioned beam 65.

Also attached to the end of the rod 64 is the cylindrical member 66. Pivotally secured at 67 to the U-shaped member 68 is a cam member having the lower curved portion 69, the cam member extending into the vertical lever portion 70, and attached at 71 to the lever portion 70 are the cables 72 which pass around the pulleys 73, the cables 72 being secured at the points 74 to small levers which are adapted to operate the various clutches 75, 76, 77, 78 and 79 which clutches are adapted to operate the various shafts 33, 25 and 29.

Attached across the beams 10 is a further transverse platform 80 beneath which are secured the pulleys 81, and passing over the pulleys 81 are the cables 82 which pass over further pulleys 83 which cables pass forwardly and are secured at 84 to the transverse member 65 and also attached at 84 are the further cables 85 which pass over pulleys 86 and 87, all of these cables thence extending downwardly and terminating in the hooks 88 which hooks engage the members 53.

The machine as above described provides several advantages as heretofore mentioned in the objects of my invention together with further advantages as will be apparent from the following description of the operation of the same.

As the machine travels forwardly in the direction of the arrow 89 (see Figure 1) it will be noted that the crop seed is deposited since the crop seed hopper 28 is operated by means of the chain drive 22 etc., and after the seed is deposited the disks 51 will plow the seed rather deeply into the ground. The fertilizer passing from the hopper 26, and which is agitated by the drive 21 etc., is also deposited on the ground with the rear disks 56 thence plowing the fertilizer into the soil. Next, the grass seed which is contained within the hopper 40, is deposited on the ground surface and at a very slight penetration only, due to the fact that it cannot be plowed in deeply, this grass seed thence being harrowed, so that as a result the crop seed is planted rather deeply which is the desired method, and fertilized, and the grass seed is deposited at a slight depth only and is assisted by the fertilizer, so that the grass seed will thus provide a hay or pasture crop since the grass seed will usually grow during the year after the crop grows, and also improves the soil from the standpoint of firmness and the like, the planting of the various crop seeds and grass seed in this manner being desirable for a variety of other purposes which are well-known.

The hoppers 26 and 28 can be filled by raising the lids thereof while the operator stands on the boards 41 or 42, and the hopper 40 can be filled while standing on the ground.

When it is desired to transport the entire unit to another field etc., the hydraulic cylinder 62 is operated, which causes the rod 64 to travel toward the right as viewed in Figure 1, which due to the attachment of the various cables at 84, will cause the cables to draw the members 53 upwardly thereby drawing the disks 51 and 56 upwardly, and at the same time the member 66 when bearing against the curved surfaces 69 of the cam will cause the lever 70 to pivot toward the right, which pulls on the cables 72, thence operating the various clutches 75, 76, 77, 78 and 79 so that the various drives to the seeding arrangements and fertilizer will be automatically disconnected, the cam surface 69 having a relatively flat portion at the forward end thereof so that the member 66 can travel forwardly a sufficient distance after operating the clutches. In this way the entire unit can be transported on the wheels 17 wherever desired with the balance of the mechanism being disconnected, the arrangement being at its normal operating condition by merely releasing all of the various elements. This device makes a definite mark in the field at all times and also the seeds and fertilizer are covered at one time in the same machine and in case of inclement weather which stops the work, there is no loss and the arrangement also permits relatively sharp turns to be made since an assemblage of several machines is not required, and the entire device has a relatively large capacity. The various fertilizer members and seeders are of standard construction, and it should also be understood that if desired these could be placed in slightly different positions by merely placing openings in the framework members 10 and by changing the positioning of the clutch cables and the chains, the present construction however being the preferred form. It should be obvious that although the invention herein uses certain drives and the like as well as disconnecting features, that other modifications could be employed as well without departing from the essential spirit of the invention.

It will now be noted that I have provided the various advantages mentioned in the objects of my invention with other advantages being readily apparent.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

A seeder, fertilizer, and tiller combine comprising a framework, a crop seeder mounted on said framework, a fertilizer mounted on said framework behind said crop seeder, a grass seeder mounted on said framework behind said fertilizer, means for operating said crop seeder, said fertilizer and said grass seeder, a pair of transporting wheels journaled to said framework, said wheels including means attached thereto for operating said crop seeder, fertilizer and grass seeder, tillage units supported from said framework and adapted to work cooperatively with said crop seeder and said fertilizer, means for raising said tillage units from soil engaging position, and means for disconnecting said seeders and fertilizer member when said tillage members are raised, including cables attached to said tillage members and to the supporting frame work, a hydraulic cylinder, a piston in said cylinder, a piston rod attached to said piston, a laterally positioned forward bar to which said cables are attached, clutch members operatively connected to the shafts which operate said seeders and said fertilizer, a cam member attached to said framework, said cam member including a lever, further cables connected to said lever and said clutches, said cam member being so arranged relative to said piston rod that upon forward movement of the piston the forward end thereof contacts and moves said cam member in a direction to release said clutches.

References Cited in the file of this patent
UNITED STATES PATENTS

| | | |
|---|---|---|
| 2,332,743 | Morris | Oct. 26, 1943 |
| 2,416,189 | McIntyre | Feb. 18, 1947 |
| 2,556,072 | Dewey | June 5, 1951 |
| 2,739,517 | Roberts | Mar. 27, 1956 |